United States Patent
Keohane et al.

(10) Patent No.: US 8,621,052 B2
(45) Date of Patent: Dec. 31, 2013

(54) PERFORMANCE TUNING FOR SOFTWARE AS A PERFORMANCE LEVEL SERVICE

(75) Inventors: Susann M. Keohane, Austin, TX (US); Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 12/859,891

(22) Filed: Aug. 20, 2010

(65) Prior Publication Data

US 2012/0047240 A1     Feb. 23, 2012

(51) Int. Cl.
  *G06F 15/177*     (2006.01)
(52) U.S. Cl.
  USPC .................................................. 709/221
(58) Field of Classification Search
  USPC .................................................. 709/221
  See application file for complete search history.

(56) References Cited

U.S. PATENT DOCUMENTS

| | | | | |
|---|---|---|---|---|
| 6,823,382 B2 * | 11/2004 | Stone | | 709/224 |
| 6,857,020 B1 | 2/2005 | Chaar et al. | | |
| 7,150,011 B2 * | 12/2006 | Ha et al. | | 717/148 |
| 7,200,657 B2 | 4/2007 | Adams et al. | | |
| 7,379,988 B2 * | 5/2008 | Bish et al. | | 709/223 |
| 7,406,686 B2 * | 7/2008 | Liu et al. | | 717/151 |
| 7,610,268 B2 | 10/2009 | Rossiter et al. | | |
| 7,757,214 B1 * | 7/2010 | Palczak et al. | | 717/121 |
| 7,877,644 B2 * | 1/2011 | Stenzel | | 719/327 |
| 7,912,956 B1 * | 3/2011 | Williams et al. | | 709/226 |
| 8,073,721 B1 * | 12/2011 | Lewis | | 705/7.12 |
| 8,281,098 B2 * | 10/2012 | Eguchi et al. | | 711/162 |
| 2002/0099669 A1 * | 7/2002 | Lauer | | 705/80 |
| 2003/0144983 A1 * | 7/2003 | Bigus et al. | | 707/1 |
| 2003/0233446 A1 | 12/2003 | Earl | | |
| 2007/0130208 A1 | 6/2007 | Bornhoevd et al. | | |
| 2007/0234365 A1 | 10/2007 | Savit | | |
| 2008/0077652 A1 | 3/2008 | Grant et al. | | |
| 2008/0147589 A1 * | 6/2008 | Ashcraft et al. | | 706/53 |
| 2009/0119673 A1 * | 5/2009 | Bubba | | 718/104 |
| 2009/0276771 A1 * | 11/2009 | Nickolov et al. | | 717/177 |
| 2011/0231846 A1 * | 9/2011 | Sabin et al. | | 718/100 |
| 2011/0295727 A1 * | 12/2011 | Ferris et al. | | 705/34 |
| 2011/0295998 A1 * | 12/2011 | Ferris et al. | | 709/224 |
| 2011/0296000 A1 * | 12/2011 | Ferris et al. | | 709/224 |
| 2011/0296019 A1 * | 12/2011 | Ferris et al. | | 709/226 |
| 2011/0296021 A1 * | 12/2011 | Dorai et al. | | 709/226 |
| 2011/0296023 A1 * | 12/2011 | Ferris et al. | | 709/226 |
| 2012/0324116 A1 * | 12/2012 | Dorai et al. | | 709/226 |
| 2013/0197675 A1 * | 8/2013 | McCarthy et al. | | 700/28 |

* cited by examiner

*Primary Examiner* — Imad Hussain
(74) *Attorney, Agent, or Firm* — Stephen R. Tkacs; Stephen J. Walder, Jr.; Libby Z. Toub

(57) ABSTRACT

A mechanism is provided for performance tuning for software as a performance level service. At the request of a customer, a cloud provider may use a performance tuning component to determine performance parameters to increase performance of an application running on a given hardware platform. The cloud provider may then generate a tuning configuration and associate the tuning configuration with the customer such that when the cloud provider deploys a customer's software to a partition in a host system, the cloud provider sends the tuning configuration with the deployment package. The performance tuning component at the host system then applies the performance parameters in the tuning configuration to increase performance.

20 Claims, 5 Drawing Sheets

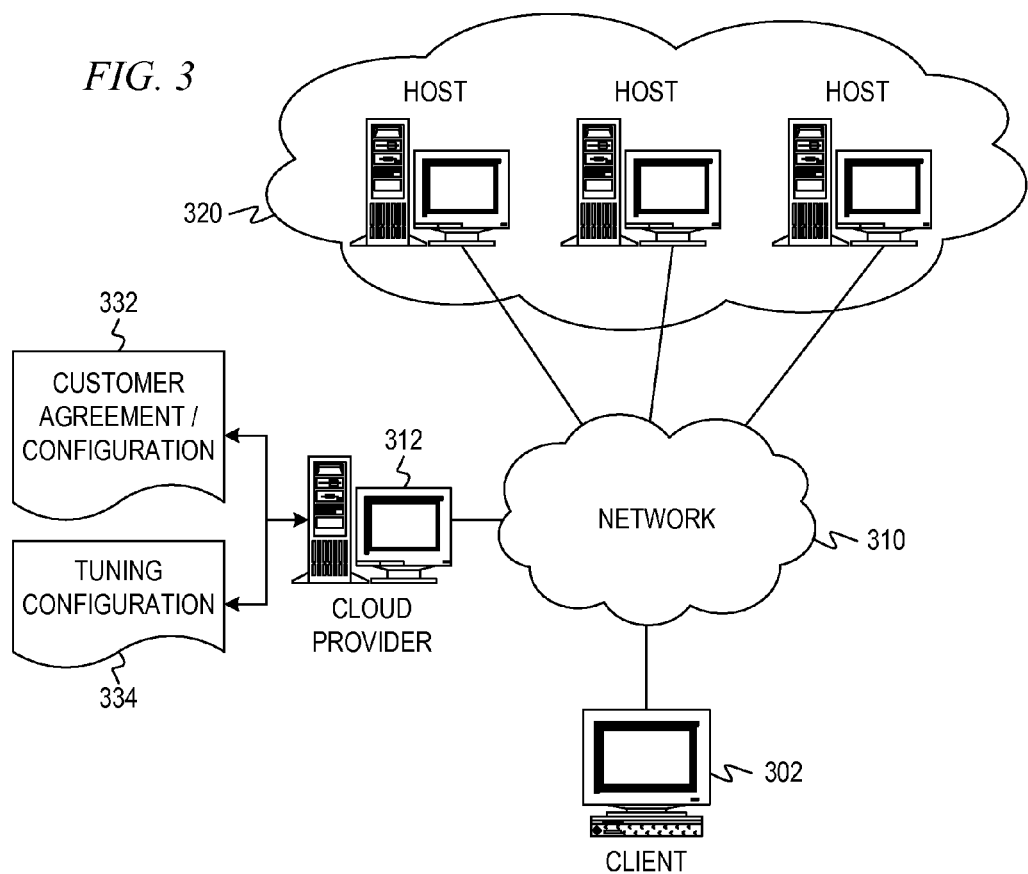
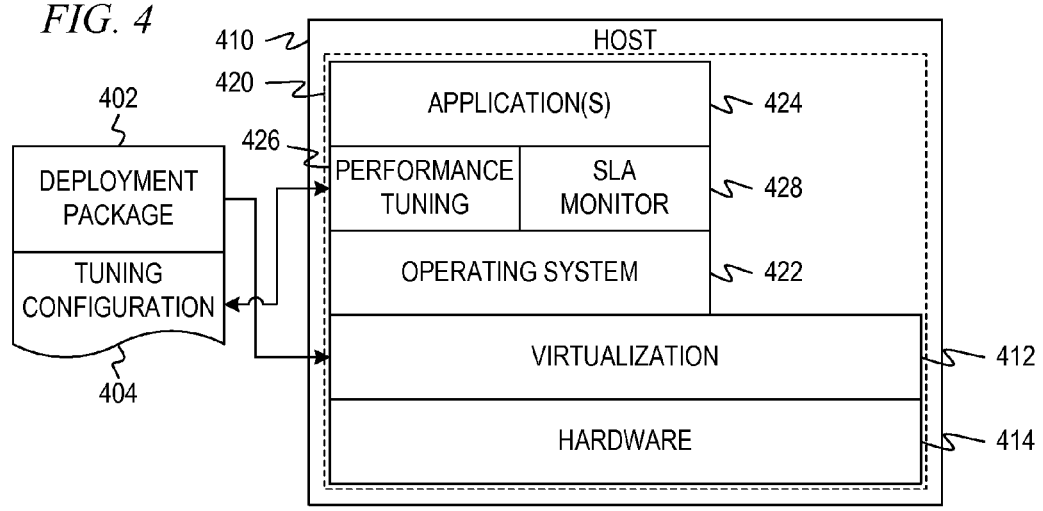

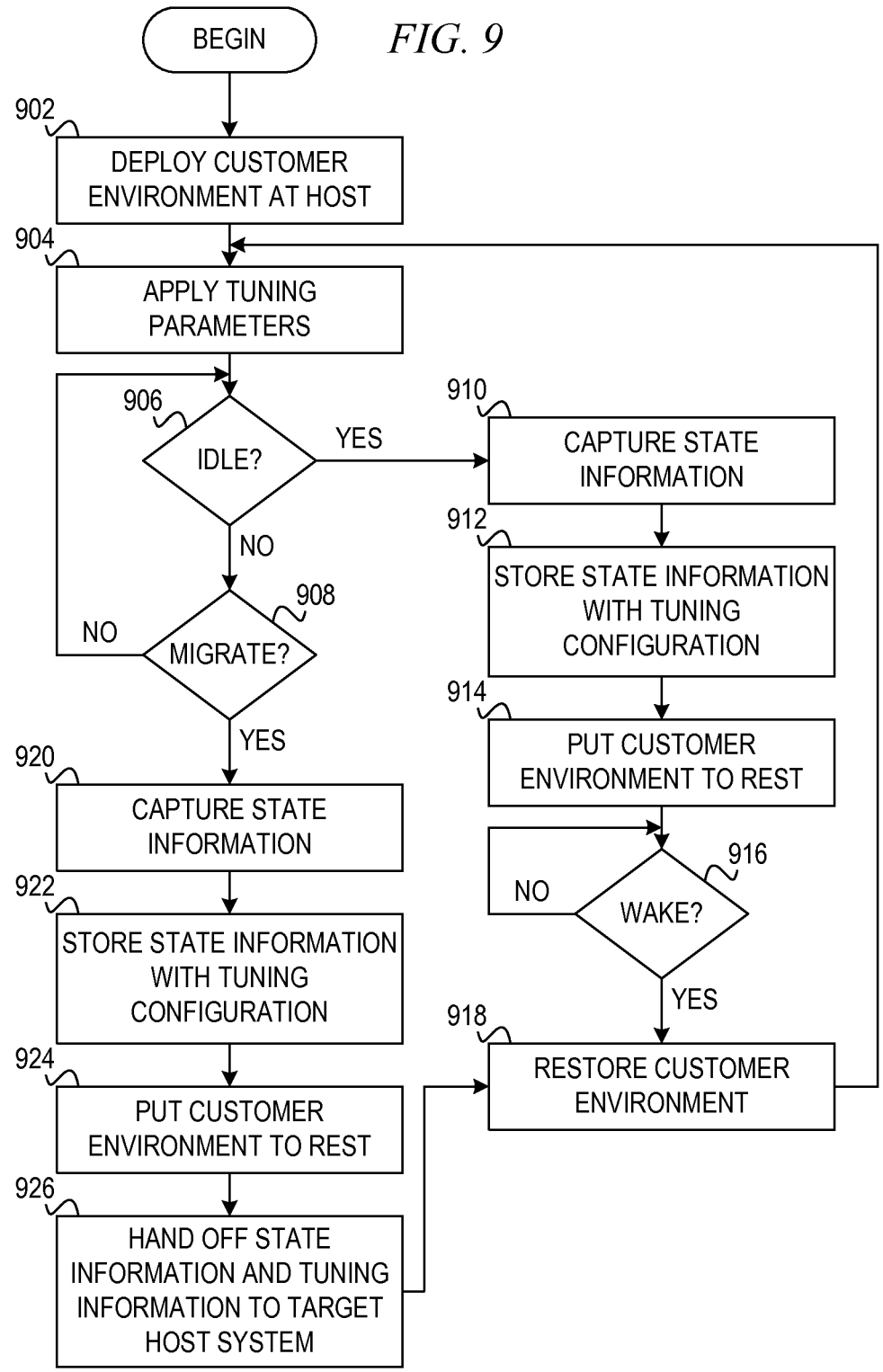

PERFORMANCE TUNING FOR SOFTWARE AS A PERFORMANCE LEVEL SERVICE

BACKGROUND

The present application relates generally to an improved data processing apparatus and method and more specifically to mechanisms for performance tuning for software as a performance level service.

Cloud providers sell software-as-a-service (Saas) and platform-as-a-service (PaaS) products to customers who wish to license an application for use as a service on demand, either through a time subscription or a "pay-as-you-go" model. The SaaS or PaaS model allows vendors to develop, host, and operate software and hardware for customer use. Rather than purchase the hardware and software to run an application, customers need agree to terms with the provider, and users may access the software or hardware using any client, such as a desktop computer or notebook, for example. The customer may license software for a single user or for a group of users.

SaaS software vendors may host the application on their own Web servers, disabling it after use or after the on-demand contract expires. While SaaS was widely deployed initially for sales force automation and Customer Relationship Management (CRM), its use has become commonplace by businesses for tasks such as computerized billing, invoicing, human resource management, service desk management, and sales pipeline management, among others.

PaaS offerings facilitate deployment of applications without the cost and complexity of buying and managing the underlying hardware and software and provisioning hosting capabilities, providing all of the facilities required to support the complete life cycle of building and delivering web applications and services entirely available from the Internet. PaaS offerings may include facilities for application design, application development, testing, deployment, and hosting as well as application services such as team collaboration, web service integration and marshalling, database integration, security, scalability, storage, persistence, state management, application versioning, application instrumentation and developer community facilitation. These services may be provisioned as an integrated solution over the web.

A service level agreement (SLA) is a negotiated agreement between two parties where one is the customer and the other is the service provider. This can be a legally binding formal or informal contract. The SLA records a common understanding about services, priorities, responsibilities, guarantees, and warranties. The SLA may specify the levels of availability, serviceability, performance, operation, or other attributes of the service, such as billing. The level of service can also be specified as "target" and "minimum," which allows customers to be informed what to expect, while providing a measurable target value that shows the level of organization performance. Thus, customers may enter into a contract with a cloud provider for a specified performance level for a SaaS or PaaS product.

Therefore, a customer may need a CRM application with 40 seats for a 40-person sales team. The agreement may define an approximate level of performance. However, in a virtual environment with partition mobility, performance may fluctuate as an operating system and service is moved from processor to processor. Furthermore, the required performance level may be difficult to determine at the time of entering a performance-based agreement. A customer may underestimate the required performance or may outgrow an initial estimation.

SUMMARY

In one illustrative embodiment, a method, in a cloud provider data processing system, is provided for performance tuning of a performance level service. The method comprises generating, by the cloud provider data processing system, one or more performance parameters. The method further comprises storing, by the cloud provider data processing system, the one or more performance parameters in association with a customer configuration for the customer environment. The method further comprises sending, by the cloud provider data processing system, a deployment package for the customer environment and the one or more performance parameters to a host system, such that the host system deploys the customer environment and applies the one or more performance parameters to boost performance of the customer environment on the host system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 depicts a representation of a cloud computing environment in accordance with an illustrative embodiment;

FIG. 4 is a block diagram illustrating a customer environment with host tuning in a host system in accordance with an illustrative embodiment;

FIG. 9 is a flowchart illustrating operation of a mechanism for migrating a customer environment with performance tuning in accordance with an illustrative embodiment.

DETAILED DESCRIPTION

The illustrative embodiments provide a mechanism for performance tuning for software as a performance level service. At the request of a customer, a cloud provider may use a performance tuning component to determine performance parameters to increase performance of an application running on a given hardware platform. The cloud provider may then generate a tuning configuration and associate the tuning configuration with the customer such that when the cloud provider deploys a customer's software to a partition in a host system, the cloud provider sends the tuning configuration with the deployment package. The performance tuning component at the host system then applies the performance parameters in the tuning configuration to increase performance.

The host system may put the customer's partition to sleep if the customer's software is idle, if it is allowed based on the service level. In such a case, the host system may capture state information and store the state information in association with the tuning configuration. Then, when the host system wakes the customer's software, the performance tuning component may again apply the performance parameters.

The host system may also migrate the customer's partition from one processor to another or from one host system to another. The host system may capture state information and store the state information in association with the tuning configuration. The host system may then hand off the state information to the target host system such that the performance tuning component may apply the performance parameters at the target host system to increase performance.

Figure 1:
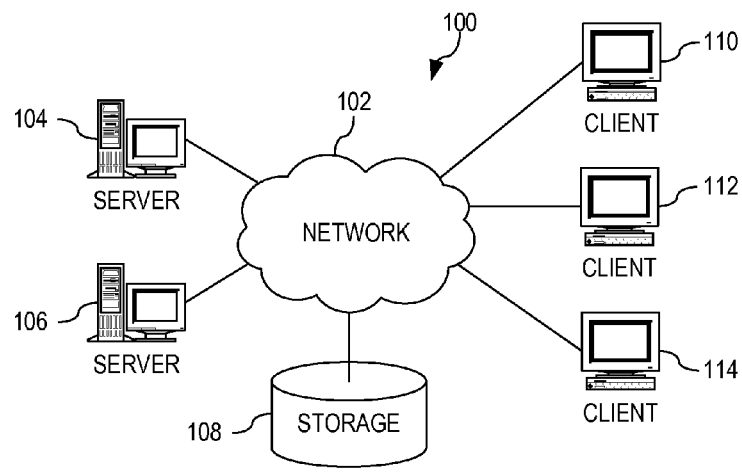
FIG. 1 depicts a pictorial representation of an example distributed data processing system in which aspects of the illustrative embodiments may be implemented.
Figure 2:
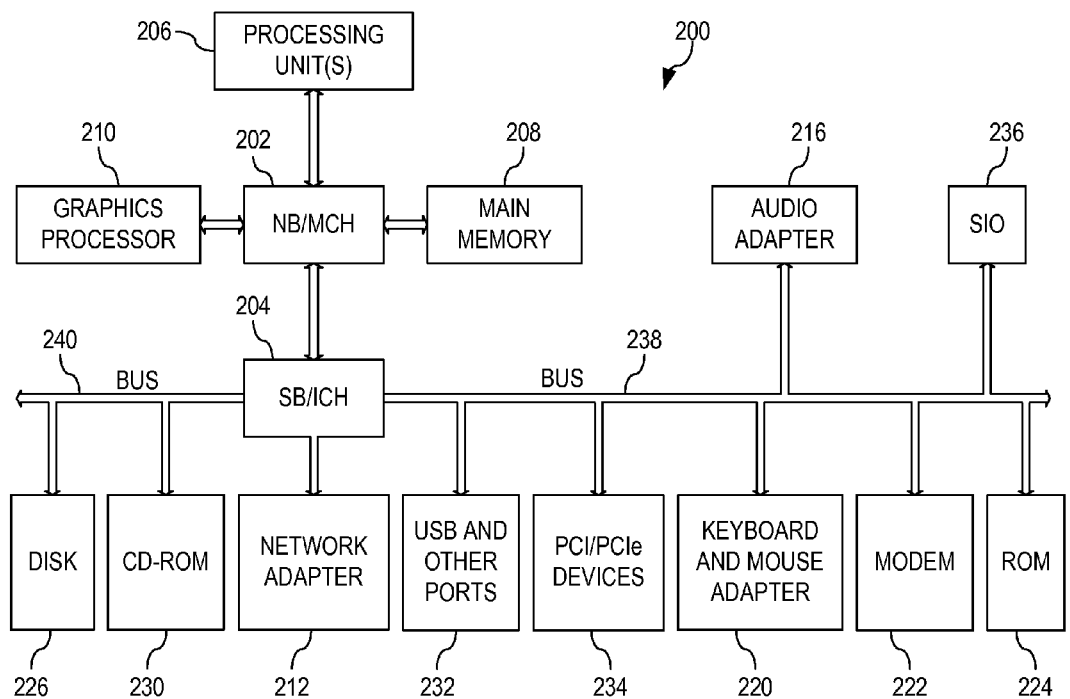
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments.

With particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

FIG. 3 depicts a representation of a cloud computing environment in accordance with an illustrative embodiment. A customer at client 302 acquires a software-as-a-service (SaaS) or platform-as-a-service (PaaS) product from a cloud provider at server 312 through network 310. The product may comprise a combination of software and hardware in cloud 320. That is, the customer at 302 may require one or more applications to run on a platform meeting certain performance requirements. That is, the customer may require a given amount of processing power, storage, security level, operating system and application performance, and network quality of service (QoS). Customer agreement/configuration defines the customer requirements for the product.

Client 302 may be one of clients 110, 112, 114 in FIG. 1, for example. Cloud provider server 312 may be server 104 or 106, for example. Cloud 320 may comprise one or more server data processing systems, such as one or more of servers 104, 106, for example. The cloud provider may deploy the customer environment to cloud 320 such that the customer's product is virtualized within cloud 320. Therefore, the customer's product appears to operate as its own machine, even though the product may execute on a time-slice of a processor, one processor of a host system, or a plurality of processors in a host system or across a plurality of host systems.

The cloud provider server may deploy the customer environment in cloud 320 by sending a deployment package to a virtualization component within one of the host systems. The virtualization component may then allocate hardware resources, instantiate the operating system, and then deploy the software for the customer environment. The deployment package may define contractual items, such as operating system and partition service metadata, such as a processor guarantee, for instance. In this example, the virtualization component determines an amount of processing power to allot to the customer environment.

Cloud providers commonly use virtualized systems for their cloud offering. This means that a single host may be use form multiple clients. Each client would only have a view of their operating system (OS) instance, in the case of PaaS or only have access to their application in SaaS. This virtualization of the host relies on hypervisor technologies which time slice the different operating systems, allowing them to run on the CPU for a time period before they are swapped out and another OS is allowed to run. The view and experience from the client 302 is that they have a dedicated host or service, even though they are actually sharing a single host and a single CPU within that host with other clients 302. When the client purchases service from a cloud provider 312, the SLA can specify the percentage amount of a single use they will be provided with. For example, a processor guarantee of 25% may be represent a quarter of a 1.6 GHz processor or they might purchase a fifth of a 2.0 GHz processor. The allocation of other resources, such as amount of memory or I/O, for example, becomes apparent given the above example.

In accordance with an illustrative embodiment, the cloud computing environment also includes a performance tuning component that adjusts parameters to boost performance. The performance tuning component may be software running on each of the host systems. For example, the performance tuning component may detect that the customer environment is sending and receiving a particular size of data (e.g., a Portable Document Format (PDF) file is larger than an American Standard Code for Information Interchange (ASCII) text file) and include a performance parameter to increase packet size. As another example, the performance tuning component may include performance parameters to match page size and disk block size. The performance tuning component stores these performance parameters in a tuning configuration file. The tuning configuration file may be an extensible markup language (XML) file, for example. The performance tuning component may return the tuning configuration to cloud provider server 312 to store the tuning configuration 334 in association with customer agreement/configuration 332.

A customer may enter into a service- or performance-level agreement and agree to a particular configuration, as defined by customer agreement/configuration 332. However, the customer may have underestimated requirements or may have outgrown the initial estimation. Thus, the customer may need a performance boost. With service- or performance-level agreements, the customer may simply amend the agreement to receive a higher level of performance. The performance tuning component of the illustrative embodiment gives the customer another choice. The customer may agree to run the performance tuning component, perhaps for a one-time fee or an additional periodic fee for applying the tuning parameters, to receive a boost in performance via the tuning configuration.

The performance tuning component may be distributed across the cloud. Therefore, the performance tuning component of one host system may communicate with the performance component of another host system. Alternatively, the performance tuning component of each host system may communicate with a central component, such as cloud provider server 312, for example. Sometimes with hundreds of performance tuning variables, if one system is getting better performance than the others, the performance tuning component may isolate the variables that are different, because those variables are likely to be responsible for the improved performance. The performance tuning component may then offer such a set of performance parameters as being a "peak performance" tuning configuration.

FIG. 4 is a block diagram illustrating a customer environment with host tuning in a host system in accordance with an illustrative embodiment. Host system 410 receives deployment package 402 with associated tuning configuration 404. Host system includes hardware 414 and virtualization component 412. Hardware 414 includes resources of the host system, such as one or more processors, memory, I/O devices, and storage, for example.

Virtualization component 412 receives deployment package 402 and allocates a portion of resources from hardware 414 for the customer environment 420 according to deployment package 402. Virtualization component 412 deploys the customer environment 420, which includes operating system 422 and applications 424. The customer environment 420 also includes service level agreement (SLA) monitor 428 and performance tuning component 426. SLA monitor 428 executes within the customer environment and monitors whether host system 410 meets the customer requirements for customer environment 420. For instance, if application performance drops below the SLA terms, SLA monitor 428 may alert virtualization component 412 to reallocate resources.

The first time performance tuning is applied, performance tuning component 426 may monitor customer environment 420 and adjust parameters to achieve improved performance. Performance tuning component 426 may communicate with performance tuning components in other host systems or a centralized site, such as cloud provider 312 in FIG. 3, for example, to receive predetermined "peak performer" configurations. Performance tuning component 426 may store these performance parameters in tuning configuration file 404. The tuning configuration file 440 may be an XML file, for example.

When the cloud provider deploys a customer environment with an existing tuning configuration 404, such as a configuration from a previous application of performance tuning component 426 or a predetermined configuration, host system 410 receives deployment package 402 and associated tuning configuration 404. Performance tuning component 426 receives tuning configuration 404 and sets parameters in operating system 422 or hardware 414 according to the tuning configuration 404. Thus, customer environment 420 may achieve improved performance without additional resources.

The depicted example shows on customer environment 420; however, host system may deploy a plurality of host systems. Each host system may comprise an instance of an operating system, one or more applications, a service level agreement monitor, and a performance tuning component.

Figure 5:
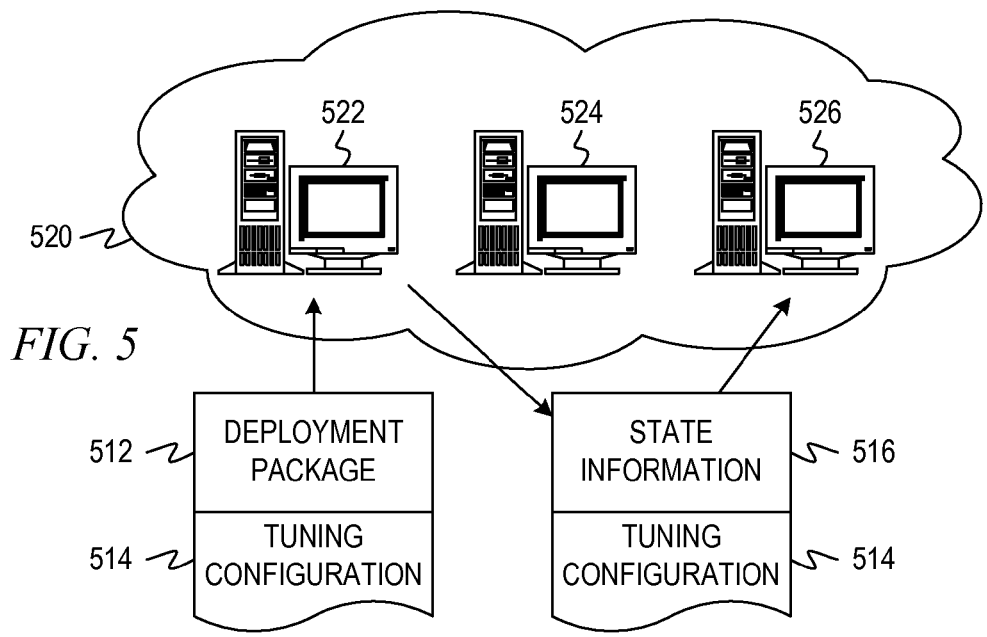
FIG. 5 depicts a representation of deployment and migration of a customer environment with host tuning in a cloud computing environment in accordance with an illustrative embodiment.

FIG. 5 depicts a representation of deployment and migration of a customer environment with host tuning in a cloud computing environment in accordance with an illustrative embodiment. Cloud 520 includes host systems 522, 524, 526. As stated above, a cloud provider may deploy a customer environment by sending deployment package 512 and tuning configuration 514 to cloud 520. In the depicted example, the cloud provider sends deployment package 512 and tuning configuration 514 to host system 522.

Host system 522 deploys the customer environment based on deployment package 512. A performance tuning component on host system 522 applies tuning configuration 514 to increase performance. Virtualization allows a customer environment to be moved from one processor to another or from one host system to another. In the depicted example, the customer environment moves from host system 522 to host system 526. Host system 522 captures state information from the customer environment, stores the state information 516 in association with the tuning configuration 514. Host system 522 hands the state information 516 and tuning configuration 514 to host system 526. Then, host system 526 restores the customer environment using state information 516. Thereafter, host system 526 applies tuning configuration 514 to improve performance.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
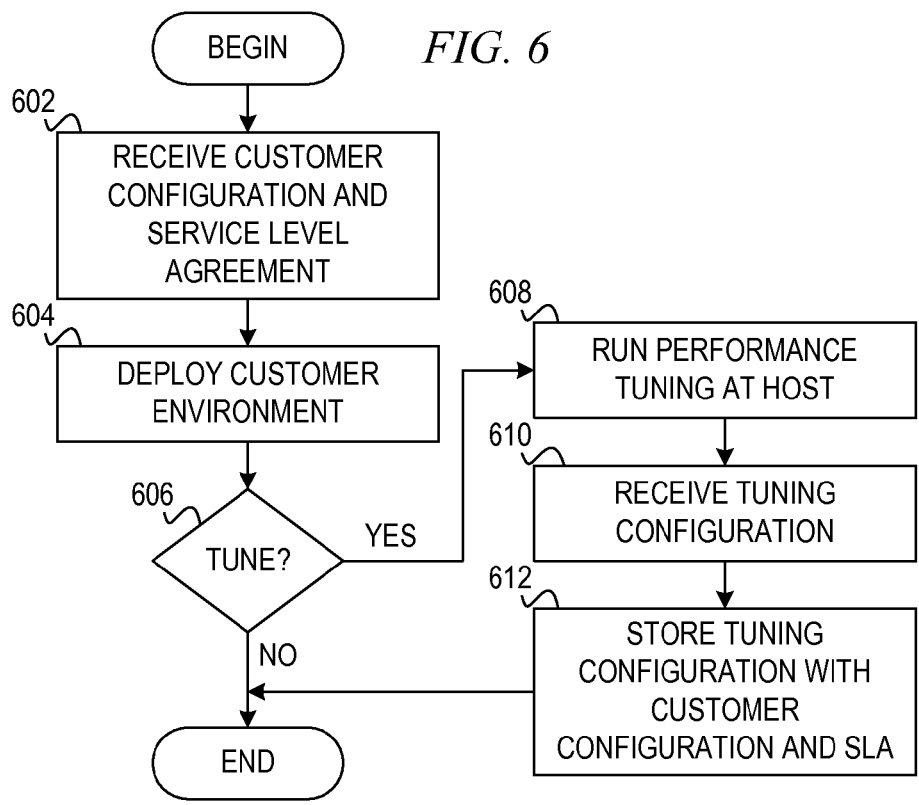
FIG. 6 is a flowchart illustrating operation of a cloud provider for performance tuning for a customer environment in accordance with an illustrative embodiment.

FIG. 6 is a flowchart illustrating operation of a cloud provider for performance tuning for a customer environment in accordance with an illustrative embodiment. Operation begins, and the cloud provider receives a customer configuration and service level agreement (block 602). The cloud provider deploys the customer environment by sending a deployment package to a host system (block 604). Then, the cloud provider determines whether the customer request performance tuning for the customer environment (block 606). If the customer does not request performance tuning, then operation ends.

If the cloud provider determines that the customer requests performance tuning in block 606, then the host system runs the performance tuning component for the customer environment (block 608). The cloud provider then receives the tuning configuration (block 610) and stores the tuning configuration with the customer configuration and service level agreement (block 612). Thereafter, operation ends.

Figure 7:
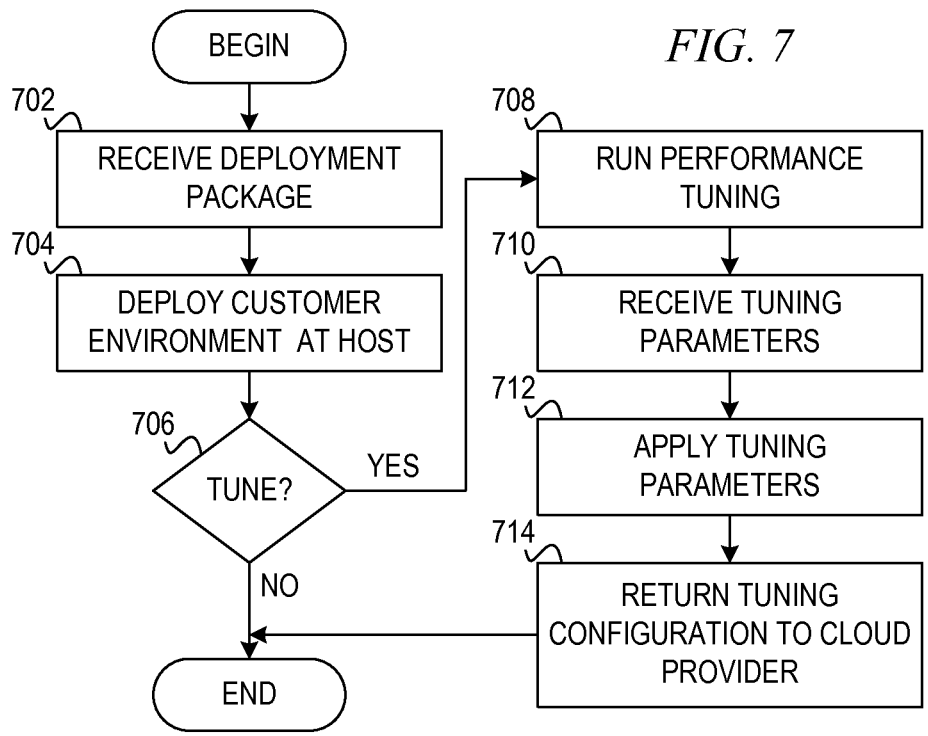
FIG. 7 is a flowchart illustrating operation of a host system for performance tuning for a customer environment in accordance with an illustrative embodiment.

FIG. 7 is a flowchart illustrating operation of a host system for performance tuning for a customer environment in accordance with an illustrative embodiment. Operation begins, and the host system receives a deployment package for a customer environment (block 702). The host system deploys the customer environment (block 704). The host system then determines whether the customer requests performance tuning (block 706). The cloud provider may notify the host system that the customer requests performance tuning In an alternative embodiment, the host system may run performance tuning to meet performance requirements in the service level agreement. If the customer does not request performance tuning, then operation ends.

If the host system determines that the customer requests performance tuning in block 706, then the host system runs performance tuning (block 708) and receives tuning parameters from the performance tuning component (block 710). Then, the host system applies the tuning parameters (block 712). The host system returns a tuning configuration comprising the tuning parameters to the cloud provider (block 714). Thereafter, operation ends.

Figure 8:
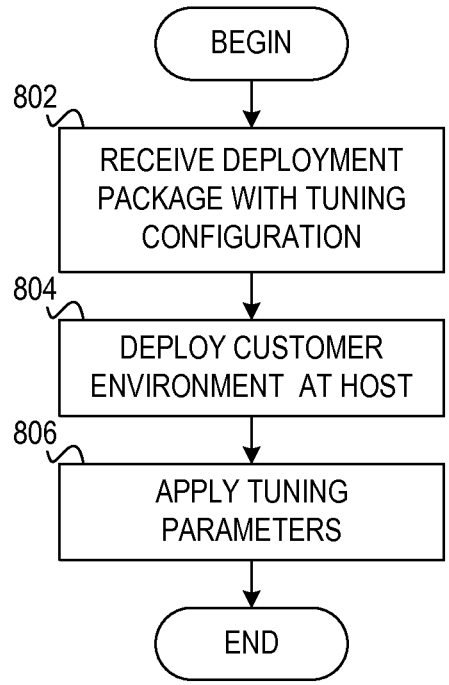
FIG. 8 is a flowchart illustrating operation of a host system for deploying a customer environment with performance tuning in accordance with an illustrative embodiment.

FIG. 8 is a flowchart illustrating operation of a host system for deploying a customer environment with performance tuning in accordance with an illustrative embodiment. Operation begins, and the host system receives a deployment package for a customer environment with a tuning configuration (block 802). The host system deploys the customer environment (block 804) and applies the tuning parameters from the tuning configuration (block 806). Thereafter, operation ends.

FIG. 9 is a flowchart illustrating operation of a mechanism for migrating a customer environment with performance tuning in accordance with an illustrative embodiment. Operation begins, and a host system deploys a customer environment (block 902). The host system applies tuning parameters (block 904). Then, the host system determines whether the customer environment is idle (block 906). If a customer environment is idle for a predetermined time period, and the service level agreement allows the customer environment to be put into a rest state, the host system may put the customer environment into a rest state to allow more resources to be used by other customers.

If the customer environment is not idle, then the host system determines whether to migrate the customer environment (block 908). Virtualization allows a partition to be moved from one processor to another or between host systems. A host system may migrate a partition, such as a customer environment, to balance workload among host systems in the cloud, for example. If the host system determines to not migrate the customer environment, then operation returns to block 906 to determine whether the customer environment is idle.

If the host system determines that the customer environment is idle in block 906, then the host system captures state information for the customer environment (block 910). The host system stores the state information with the tuning configuration of the customer environment (block 912). The host system then puts the customer environment into a rest state (block 914). Then, the host system determines whether to wake the customer environment (block 916). If the host system does not determine to wake the customer environment, operation returns to block 916, and the customer environment remains in a rest state until an event occurs to wake the customer environment. If an event occurs to wake the customer environment in block 916, the host system restores the customer environment (block 918). Thereafter, operation returns to block 904 to apply the tuning parameters.

Returning to block 908, if the host system is to migrate the customer environment, then the host system captures state information for the customer environment (block 920). The host system stores the state information with the tuning configuration of the customer environment (block 922). The host system then puts the customer environment into a rest state (block 924). Then, the host system hands off the state information and tuning configuration to the target host system (block 926). Operation proceeds to block 918 to restore the customer environment at the target host system. Thereafter, operation returns to block 904 to apply the tuning parameters.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for performance tuning for software as a performance level service. At the request of a customer, a cloud provider may use a performance tuning component to determine performance parameters to increase performance of an application running on a given hardware platform. The cloud provider may then generate a tuning configuration and associate the tuning configuration with the customer such that when the cloud provider deploys a customer's software to a partition in a host system, the cloud provider sends the tuning configuration with the deployment package. The performance tuning component at the host system then applies the performance parameters in the tuning configuration to increase performance.

The host system may put the customer's partition to sleep if the customer's software is idle, if it is allowed based on the service level. In such a case, the host system may capture state information and store the state information in association with the tuning configuration. Then, when the host system wakes the customer's software, the performance tuning component may again apply the performance parameters.

The host system may also migrate the customer's partition from one processor to another or from one host system to another. The host system may capture state information and store the state information in association with the tuning configuration. The host system may then hand off the state information to the target host system such that the performance tuning component may apply the performance parameters at the target host system to increase performance.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a first host data processing system, for performance tuning of a performance level service, the method comprising:
   receiving, by the first host data processing system, a deployment package for a customer environment and a service level agreement;
   deploying, by the first host data processing system, the customer environment, wherein the customer environment comprises an operating system, an application, a service level agreement monitor, and a first performance tuning component executing on hardware resources allocated to the customer environment by a virtualization component of the first host data processing system;
   performing, by the first performance tuning component, performance tuning on the customer environment to generate a first set of performance parameters;
   applying, by the first performance tuning component, the first set of performance parameters to the operating system or hardware resources of the first host data processing system to boost performance of the customer environment on the first host data processing system;

responsive to a second host system achieving better performance than the first host data processing system, receiving, by the first performance tuning component, a second set performance parameters from a second performance tuning component executing on the second host system;

identifying by the first performance tuning component, a subset of performance parameters in the second set of performance parameters that is different from the first set of performance parameters; and storing the subset of performance parameters in the first set of performance parameters as a peak performance tuning configuration.

2. The method of claim 1, wherein a cloud provider data processing system stores the first set of performance parameters in association with the customer configuration and the service level agreement.

3. The method of claim 1, wherein responsive to the customer environment transitioning into an idle state at the first host data processing system, the first host data processing system captures state information, stores the state information in association with the first set of performance parameters, and puts the customer environment to rest.

4. The method of claim 3, wherein responsive to the customer environment waking, the first host data processing system restores the customer environment and applies the first set of performance parameters to the operating system or hardware resources of the first host data processing system to boost performance of the customer environment on the first host data processing system.

5. The method of claim 1, further comprising:
migrating the customer environment with the first set of performance parameters from the first host data processing system to a target host system.

6. The method of claim 5, wherein migrating the customer environment comprises:
capturing state information;
storing the state information in association with the first set of performance parameters;
putting the customer environment to rest on the first host data processing system; and
handing off the state information and the first set of performance parameters from the first host data processing system to the target host system.

7. The method of claim 1, wherein the first set of performance parameters comprise a performance parameter to increase packet size.

8. The method of claim 1, wherein the first set of performance parameters comprise performance parameters to match page size and disk block size.

9. The method of claim 1, further comprising storing the first set of performance parameters in a tuning configuration file.

10. The method of claim 9, wherein the tuning configuration file comprises an extensible markup language file.

11. A computer program product comprising a computer readable storage medium having a computer readable program stored therein, wherein the computer readable program, when executed on a computing device, causes the computing device to:
receive, by a first host system, a deployment package for a customer environment and a service level agreement;
deploy, by the first host system, the customer environment, wherein the customer environment comprises an operating system, an application, a service level agreement monitor, and a first performance tuning component executing on hardware resources allocated to the customer environment by a virtualization component of the first host system;

perform, by the first performance tuning component, performance tuning on the customer environment to generate a first set of performance parameters;

apply, by the first performance tuning component, the first set of performance parameters to the operating system or hardware resources of the first host data processing system to boost performance of the customer environment on the first host system;

responsive to a second host system achieving better performance than the first host data processing system, receive, by the first performance tuning component, a second set performance parameters from a second performance tuning component executing on the second host system;

identify, by the first performance tuning component, a subset of performance parameters in the second set of performance parameters that is different from the first set of performance parameters; and store the subset of performance parameters in the first set of performance parameters as a peak performance tuning configuration.

12. The computer program product of claim 11, wherein the computer readable program further causes the computing device to:
migrate the customer environment with the first set of performance parameters from the first host system to a target host system.

13. The computer program product of claim 12, wherein migrating the customer environment comprises:
capturing state information;
storing the state information in association with the first set of performance parameters;
putting the customer environment to rest on the first host system; and
handing off the state information and the first set of performance parameters from the first host system to the target host system.

14. The computer program product of claim 11, wherein a cloud provider data processing system stores the first set of performance parameters in association with the customer configuration and the service level agreement.

15. The computer program product of claim 11, wherein the computer readable program is stored in a computer readable storage medium in a data processing system and wherein the computer readable program was downloaded over a network from a remote data processing system.

16. The computer program product of claim 11, wherein the computer readable program is stored in a computer readable storage medium in a server data processing system and wherein the computer readable program is downloaded over a network to a remote data processing system for use in a computer readable storage medium with the remote system.

17. An apparatus, comprising:
a processor; and
a memory coupled to the processor, wherein the memory comprises instructions which, when executed by the processor, cause the processor to:
receive, by a first host system, a deployment package for a customer environment and a service level agreement;
deploy, by the first host system, the customer environment, wherein the customer environment comprises an operating system, an application, a service level agreement monitor, and a first performance tuning component executing on hardware resources allocated to the customer environment by a virtualization component of the first host system;

perform, by the first performance tuning component, performance tuning on the customer environment to generate a first set of performance parameters;

apply, by the first performance tuning component, the first set of performance parameters to the operating system or hardware resources of the first host system to boost performance of the customer environment on the first host system;

responsive to a second host stem achieving better performance than the first host data processing system, receive, by the first performance tuning component, a second set performance parameters from a second performance tuning component executing on the second host system;

identify, by the first performance tuning component, a subset of performance parameters in the second set of performance parameters that is different from the first set of performance parameters; and store the subset of performance parameters in the first set of performance parameters as a peak performance tuning configuration.

18. The apparatus of claim 17, wherein a cloud provider data processing system stores the first set of performance parameters in association with the customer configuration and the service level agreement.

19. The apparatus of claim 17, wherein the instructions further cause the processor to:
migrate the customer environment with the first set of performance parameters from the first host system to a target host system.

20. The apparatus of claim 19, wherein migrating the customer environment comprises:
capturing state information;
storing the state information in association with the first set of performance parameters;
putting the customer environment to rest on the first host system; and
handing off the state information and the first set of performance parameters from the first host system to the target host system.

* * * * *